(12) United States Patent
Gupta

(10) Patent No.: US 10,937,300 B2
(45) Date of Patent: Mar. 2, 2021

(54) RADIO FREQUENCY TRANSMISSION DEVICE THAT TRIGGERS ELECTROMECHANICAL ACTIONS WIRELESSLY USING SMART DEVICE ELECTRICAL BEHAVIOR

(71) Applicant: Vinay Gupta, New York, NY (US)

(72) Inventor: Vinay Gupta, New York, NY (US)

(73) Assignee: OhnKat Inc., Corona, CA (US)

( * ) Notice: Subject to any disclaimer, the term of this patent is extended or adjusted under 35 U.S.C. 154(b) by 0 days.

(21) Appl. No.: 16/661,947

(22) Filed: Oct. 23, 2019

(65) Prior Publication Data

US 2020/0135007 A1 Apr. 30, 2020

Related U.S. Application Data

(60) Provisional application No. 62/752,101, filed on Oct. 29, 2018.

(51) Int. Cl.
| | |
|---|---|
| *G08B 29/04* | (2006.01) |
| *H04N 7/18* | (2006.01) |
| *G08B 5/36* | (2006.01) |
| *G08B 3/10* | (2006.01) |
| *G08B 21/18* | (2006.01) |
| *H05B 45/10* | (2020.01) |
| *H05B 45/30* | (2020.01) |
| *H02M 7/00* | (2006.01) |

(52) U.S. Cl.
CPC ............. *G08B 29/04* (2013.01); *G08B 3/10* (2013.01); *G08B 5/36* (2013.01); *G08B 21/182* (2013.01); *G08B 21/185* (2013.01); *H02M 7/003* (2013.01); *H04N 7/186* (2013.01); *H05B 45/10* (2020.01); *H05B 45/30* (2020.01)

(58) Field of Classification Search
None
See application file for complete search history.

(56) References Cited

U.S. PATENT DOCUMENTS

| | | | |
|---|---|---|---|
| 5,757,267 A * | 5/1998 | Xydis | G08B 3/10 340/12.54 |
| 6,442,241 B1 | 8/2002 | Tsumpes | |
| 6,759,955 B2 | 7/2004 | Koneff et al. | |
| 7,023,327 B1 * | 4/2006 | Chen | G08B 3/10 340/326 |
| 7,218,220 B1 * | 5/2007 | Bovsun | G08B 3/10 340/326 |
| 8,780,201 B1 | 7/2014 | Scalisi et al. | |
| 9,179,109 B1 | 11/2015 | Scalisi et al. | |

(Continued)

*Primary Examiner* — Curtis J King
(74) *Attorney, Agent, or Firm* — Kirk A. Buhler; Buhler & Associates Patenting

(57) ABSTRACT

A radio frequency transmission device that triggers electromechanical actions wirelessly using smart device electrical behavior is disclosed. This invention allows for the uninterrupted capture of electrical events while the smart device processes first trigger inside a software loop and can wirelessly create useful actions based on electrical events. It also allows for plug and play functionality of wireless RF repetitive functionality to smart device installations. This is best exemplified by a smart doorbell installation with our RF transmitter attached to a plug-in power supply that allows for continuous functionality and repeated ringing of a chime triggered by an RF signal.

20 Claims, 3 Drawing Sheets

(56) References Cited

U.S. PATENT DOCUMENTS

| | | | | |
|---|---|---|---|---|
| 9,888,337 B1* | 2/2018 | Zalewski | ............... | H04L 67/10 |
| 10,311,685 B1* | 6/2019 | Long | ................... | H02M 1/4233 |
| 10,334,708 B2* | 6/2019 | Kim | ....................... | H05B 47/19 |
| 10,380,854 B1* | 8/2019 | Yu | ......................... | G10L 17/005 |
| 10,607,458 B1* | 3/2020 | Sampson | ............... | H02H 9/025 |
| 2010/0195810 A1* | 8/2010 | Mota | ..................... | H04N 7/186 |
| | | | | 379/167.12 |
| 2013/0017812 A1* | 1/2013 | Foster | ................... | H04N 7/186 |
| | | | | 455/417 |
| 2014/0070922 A1* | 3/2014 | Davis | .................. | H04M 11/025 |
| | | | | 340/6.1 |
| 2014/0300311 A1* | 10/2014 | Caren | .................. | H01M 10/425 |
| | | | | 320/103 |
| 2016/0128167 A1* | 5/2016 | Sun | ........................ | A63J 17/00 |
| | | | | 315/297 |
| 2016/0163163 A1* | 6/2016 | Siminoff | .................. | G08B 5/36 |
| | | | | 340/330 |
| 2016/0205362 A1* | 7/2016 | Tang | ................... | H04N 9/3173 |
| | | | | 348/744 |
| 2016/0323977 A1* | 11/2016 | Sun | ........................ | H05B 47/19 |
| 2018/0131142 A1* | 5/2018 | Satheesh | ............ | H01R 13/7175 |
| 2019/0014649 A1* | 1/2019 | Kim | ....................... | G06F 3/0312 |
| 2019/0347916 A1* | 11/2019 | Wild | ..................... | H04L 67/025 |

* cited by examiner

RADIO FREQUENCY TRANSMISSION DEVICE THAT TRIGGERS ELECTROMECHANICAL ACTIONS WIRELESSLY USING SMART DEVICE ELECTRICAL BEHAVIOR

CROSS REFERENCE TO RELATED APPLICATION

This application claims the benefit of Provisional Application Ser. No. 62/752,101 filed Oct. 29, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a device that triggers actions based upon operation of a smart device. More particularly, the invention monitors a smart device and when the smart device performs a particular action the invention will send a radio frequency transmission to a receiver that will perform an electromechanical action.

Description of Related Art Including Information Disclosed Under 37 CFR 1.97 and 1.98

There has been a steady increase of smart devices that utilize the internet or Wi-Fi to communicate. These devices rely upon a stable internet and/or Wi-Fi router connection to communicate for effective operation. Their Wi-Fi and internet communications are private and use proprietary protocols. Because of this, the smart devices only work with their own proprietary extraneous devices if at all available, when wireless functionality is needed. This closed ecosystem, and limitations on how smart devices can be powered, renders them of limited use in many situations. For example, smart video doorbells require high integrity doorbell wiring and installed traditional chimes to cause ringing as a traditional doorbell when the smart video doorbell is pressed. If a person doesn't have these conditions satisfied they will not hear a traditional chime ring in their home or will have to go with some restrictive proprietary solution that works only using Wi-Fi or internet and requires using all subsystems from only one provider viz. closed ecosystem. Further, when Wi-Fi and internet are down, this solution doesn't work.

U.S. Pat. No. 6,442,241 issued on Aug. 27, 2002 to William J. Thumps and is titled Automated Parallel and Redundant Subscriber Contact and Event notification system. This patent discloses an automated parallel and redundant subscriber contact and event notification system capable of being triggered by the change in status of any sensing device or process including the sensor of an alarm system or other event. While there are redundant subscriber notifications, they all require a wire or an internet connection.

U.S. Pat. No. 6,759,955 issued on Jul. 6, 2004 to John A. Koneff et al and is titled Doorbell System. This patent discloses a doorbell system includes first and second pushbutton and an RF transmitter activatable by the first and second pushbutton. An RF receiver is configured to receive RF signals from the RF transmitter. While this patent is for an RF doorbell that can record information, the device is completely wireless and does not operate with a smart doorbell.

U.S. Pat. Nos. 8,780,201 and 9,179,109 issued on Jul. 15, 2014 and Nov. 3, 2015, respectively, to Seton Paul Kasmir et al and are titled Doorbell communication systems and methods. These patents disclose a doorbell system can include a remote computing device and a doorbell that has a camera. The doorbell can enter a camera sleep mode wherein the camera is configured not to record. The remote computing device can be used to override a power setting of the doorbell to enable the doorbell to record a video. Then, the remote computing device can receive the video that was recorded by the doorbell. These disclose a smart doorbell, but they rely on an internet and Wi-Fi connection for operation.

What is needed is a signaling system that operates with a smart device, that is attached to a plug-in power supply for continuous functionality and repeated ringing of a chime or other response that is triggered by an RF signal. The radio frequency transmission device that triggers electromechanical actions wirelessly using smart device electrical behavior disclosed in this document provides the solution.

BRIEF SUMMARY OF THE INVENTION

It is an object of the RF trigger and response from a smart device to allow for plug and play application of wireless radio frequency (RF) repetitive functionality to smart device installations. It also allows for the uninterrupted response to electrical events created due to a smart device and can wirelessly create useful actions based on such electrical events while the smart device processes the first trigger inside a software loop. This is best exemplified by a smart doorbell installation with the invention attached to a plug-in power supply that allows for continuous functionality and repeated ringing of a chime triggered by an RF signal.

It is another object of the RF trigger and response from a smart device to connect to internet connected smart devices, such as video doorbells, which are limited in their ability to be powered and produce actions within the home outside of their specific internet enabled ecosystem. Currently smart devices only interact wirelessly with proprietary Wi-Fi devices, an approach which has clear limitations and always needs an available Wi-Fi network, or need to be connected via wires to compatible devices. The latter use case, in the case of video doorbells, implies a traditional chime installation which requires wiring expertise to properly install the chime.

It is another object of the RF trigger and response from a smart device to operate wirelessly and expansively across multiple manufacturers devices and needs no electrical expertise for installation. In addition, the radio frequency transmitter can activate one or more receivers and multiple transmitters can activate a single receiver or discreet receivers in the same environment if desired by the consumer, to achieve a multitude of outcomes.

It is another object of the RF trigger and response from a smart device to be an improvement on what currently exists. Currently smart devices such as video doorbells trigger events asynchronously by running a software logic loop in response to a mechanical action such as a press of a video doorbell button, motion sensors or user initiated digital triggers. In this software loop, they may ignore additional user actions, even though those actions are generating actionable electrical impulses, or may be rendered ineffectual when the Wi-Fi network is down. Further, proprietary software and firmware and lack of standards restrict the ability to interface with products outside of the product ecosystem. Wi-Fi chimes are dependent upon strong Wi-Fi signals and have a delay in operation as opposed to the expected immediate response of a traditional chime doorbell. The RF trigger and response from a smart device is not dependent on a Wi-Fi signal as it operates over radio frequency which in a home environment can be more robust. In addition, the RF trigger and response from a smart device is agnostic to product ecosystem and will work across devices.

It is still another object of the RF trigger and response from a smart device for the RF trigger and response from a smart device to allow smart doorbells (and other smart devices) to have repetitive functionality, such as ringing a chime when a bell is pressed, even if they do not allow that functionality independently. In a smart doorbell installation, current systems do not allow for repeated in home chime activation in quick succession. The invention also allows the user to migrate to a different product ecosystem while preserving some of the investment.

It is still another object of the RF trigger and response from a smart device to operate with uninterrupted capture of electrical events while the smart device processes the first trigger inside a software loop and can create useful actions based on electrical events. It also allows for plug and play functionality of wireless RF repetitive functionality to smart device installations. This is best exemplified by a smart doorbell installation with our RF transmitter attached to a plug-in power supply that allows for continuous functionality and repeated ringing of a chime triggered by an RF signal.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
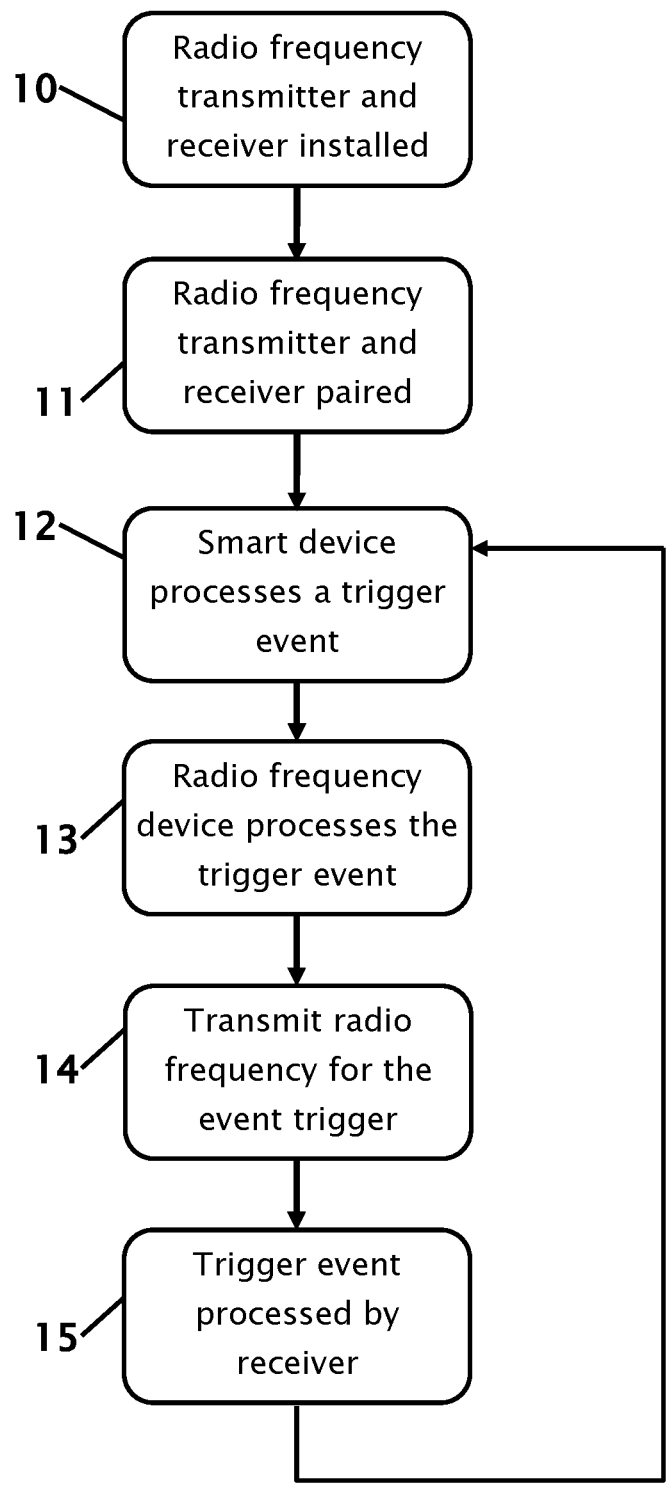
FIG. 1 shows a flow chart for the RF trigger and response from a smart device on a smart doorbell.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

The invention works wirelessly and expansively across multiple manufacturers devices and needs no electrical expertise for installation. In addition, the radio frequency transmitter can activate one or more receivers and multiple transmitters can activate a single receiver or discreet receivers in the same environment if desired by the consumer, to achieve a multitude of outcomes. The invention is a plug and play radio frequency transmission device installed in conjunction with smart device (e.g., internet connected video doorbells) power supplies that allows for unimpeded smart device operation while translating electrical characteristics of trigger events into actionable radio frequency signals. The flowchart in FIG. 1 shows one contemplated embodiment for operation for the radio frequency (RF) trigger and response from a smart device on a smart doorbell. The radio frequency transmitter and receiver are installed after a smart device is installed 10 or at a future time after the smart device has been installed. The radio frequency transmitter and receiver are paired 11. The operation allows for:

a. Continuous power supply to smart devices for full-time functionality;

b. When the smart device processes a trigger event (e.g., doorbell press) 12;

c. The radio frequency device processes the electrical characteristics of the trigger event 13;

d. Creates and transmits a signal to produce a defined action in a paired radio frequency receiving device 14;

d. The radio frequency signal can be repeated when electrical trigger events are repeated in quick succession (e.g., repeated doorbell press will result in repeated rings) 15. While the example of a doorbell ring is disclosed, the response behavior could be a sound, a change in a light status, a change to an electrically powered device or a change to an outlet.

Figure 2:
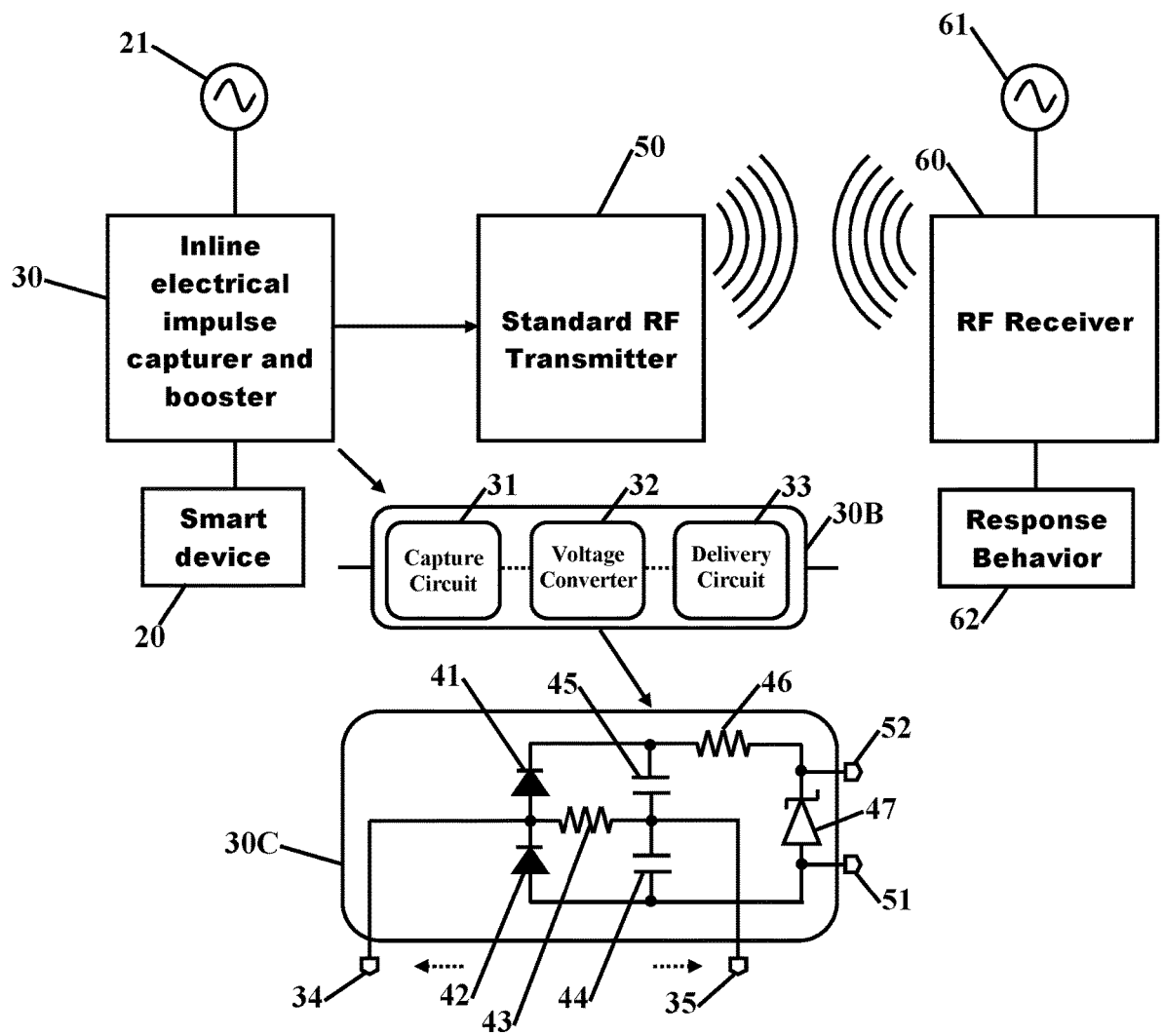
FIG. 2 shows the components used in a preferred embodiment.

Multiple receivers and transmitters can be installed so they each perform different functions or the same function. FIG. 2 shows the components used in a preferred embodiment. The smart device is powered by a power supply 21.

The Version of The Invention Discussed Here Includes:
Capture Circuit 31
Voltage Converter 32
Delivery Circuit 33
Resistor 43
Diode 41
Diode 42
Capacitor 45
Capacitor 44
Resistor 46
Zener Diode 47
Relationship Between the Components:

There are three parts to converting the electrical impulse in the smart device 20 circuit into actionable electromotive force to trigger the RF transmission through the RF transmitter 50.

First, identify the power level and signal thresholds of the requisite RF transmitter circuit 50. Then deploy a capture circuit 31, typically an ideally sized resistor 43 to create a voltage drop that can be used as the basis for generating the output electromotive signal that will trigger the transmitter circuit. The resistor 43 (or equivalent combination of electronic components) is sized to provide the optimum range of voltage drop at the time of impulse current flow. The resistor 43 should be able to meet the power specifications of being inline during regular smart device 20 circuit operation. The resistor 43 should not impede the performance of the smart device circuit and yet be the right size to provide the requisite voltage drop.

A voltage converter circuit 32, or other suitable rectifier circuit, which can be some combination of diodes, capacitors and other electrical components is then used to convert this voltage drop across Part 4, into a suitable electrical signal. Shown is an example of voltage doubler rectifier circuit here, which provides an approximately doubled voltage as the output of the converter circuit using diode 41, diode 42 and capacitors 44 and 45.

The output of the voltage converter 32 circuit is then provided to a delivery circuit 33 which is designed to deliver the right signal level to an RF transmitter 50. The delivery circuit 33, which may be, but is not restricted to, a combination of Zener diode 47 and resistor 46, provides a capped voltage and sufficient power (electromotive force) to the transmitter circuit 50 so that the transmitter circuit 50 is optimally powered to generate an RF signal. The delivery circuit 33 is designed to not overpower the transmitter circuit.

How the Invention Works:

By understanding the electrical characteristics of smart devices 20 and what happens in the circuit that contains them when they respond to external or self-triggers, a system can be designed to perform concomitant extraneous electro-mechanical actions through RF signals.

This document identifies and creates a circuit that will translate the relevant electrical pulse in the smart device 20 circuit at contacts 34 and 35, into a suitable electromotive signal that will meet the signal and power threshold requirements for an RF circuit and will trigger an RF emission at contacts 51 and 52. This RF emission from the RF transmitter 50 can then be picked up by an external RF receiver 60 that is suitably paired with the RF transmitter 50 and the RF receiver 60 can then electromechanically drive the desired external response behavior 62. The components, once assembled, will work as follows:

When installed in conjunction with a power supply 21 and a smart device 20, there is a continuous flow of electrical power from the power supply 21, through the inline electrical impulse capturer and booster 30, 30B, 30C, to the smart device 20 for continuous operation. The inline electrical impulse capturer and booster is shown as a single block 30, the operational units 30B and as a circuit schematic 30C.

When a trigger event is precipitated on the smart device 20 (e.g., doorbell push) the electrical signal characteristics cause the inline electrical impulse capturer and booster 30, 30B, 30C to tip over a threshold voltage level creating an electromotive force that results in transmission of a radio frequency command from the radio frequency transmitter 50.

The paired radio frequency receiver 60, upon receipt of the radio frequency transmission, will execute the desired electromechanical function or response behavior 62 (e.g. play a doorbell chime note).

If the trigger event is repeated in short succession, the radio frequency transmitter will repeat the transmission resulting in repetition of the desired function by the radio frequency receiver 60 and response behavior 62. The receiver 60 is powered by a separate power supply 61 that can also power the response behavior 62.

How to Make the Inline Electrical Impulse Capturer and Booster:

Each of the numbered components can be assembled in the requisite order to cause the full functionality of the invention.

The three modules—capture circuit 31, voltage converter 32 and delivery circuit 33—can be attained through a combination of electronic components. The three modules are essential but their composition in terms of type and values of electronic components used, and the arrangement in which they are used can be varied depending on the electrical specifications of the transmitter circuit 50 and the electrical characteristics of the trigger event from the smart device 20.

The capture circuit 31 can be any combination of resistors and suitable electrical components that can provide a suitable voltage drop when the relevant electrical impulse occurs, but does not negatively impede the performance of the smart device and the circuit.

The voltage converter 32 can be any suitable rectifier circuit (such as a single rectifier, bridge rectifier or doubler rectifier circuit) that can generate the right signal type, duration and strength for the RF transmitter.

The delivery circuit 33 can be a combination of electrical components to suitably expand or narrow the range and strength of electromotive signal delivered to the RF transmitter 50 at terminals 51/52 as per the duration and performance requirements of the RF transmitter 50.

The RF signal can be substituted with other suitable wireless signals; in such a case the RF transmitter 50 and RF receiver 60 will be substituted with the appropriate wireless equipment.

The inline electrical impulse capturer and booster 30, 30B, 30C covers the understanding, trapping and translating of smart device 20 circuit behavior into generating other concomitant signals for desired extraneous electro-mechanical or response behavior 62 actions.

Figure 3:
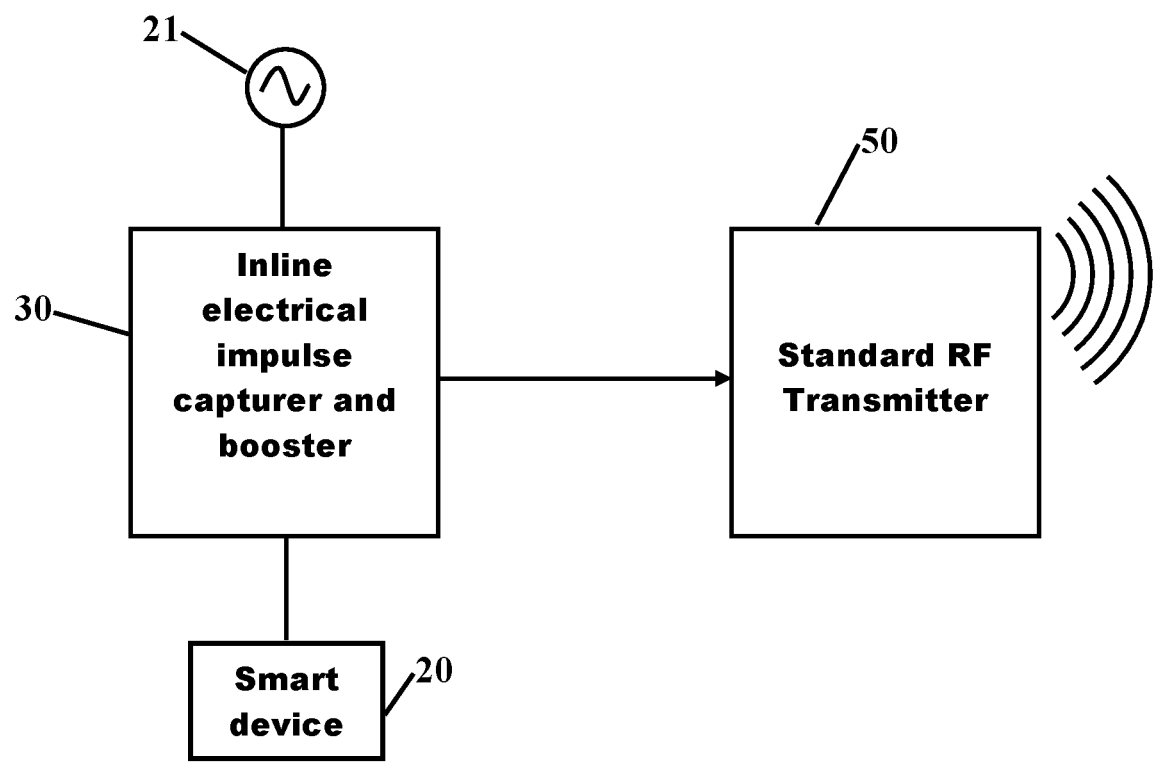
FIG. 3 shows a block diagram of the components, that, once assembled provides for plug and play functionality.

How to Use the inline electrical impulse capturer and booster:

FIG. 3 shows a block diagram of the components, that, once assembled provides for plug and play functionality. The radio frequency transmission 50 device is designed to work in series between a smart device 20 and plugged in power supply 21 and paired with radio frequency receiver/s. Once powered, the transmission device allows for the continuous flow of power to the smart device 20 and remains ready for a trigger event. It remains in a ready state at all times. Once installed the inline electrical impulse capturer and booster operates without additional interference from a person and will respond to the designated trigger event automatically.

Additionally: This inline electrical impulse capturer and booster can easily be adapted for use in other fields. Its design—a radio frequency transmitter 50 in series with a device and power supply 21 and a separate radio frequency receiver—can be used in any situation where a trigger event and resulting action would be beneficial. This can be especially useful where the electrical patterns of the device can be leveraged to produce extraneous actions, and/or when the device by itself is constrained by its design (software or otherwise) to perform those functions. Since electrical current flow can be seen as a universal standard versus proprietary software logic and platforms, this allows for a much broader and more effective application of solutions to environments where disparate devices with different and potentially incompatible software and firmware are being used. For example, in the medical field it would be useful for monitoring heart function and anomalous events, where wired or Wi-Fi systems would be impracticable or are too expensive to install due to different or lack of functioning software and firmware. In addition, it would work in security and monitoring functions where motion or temperature detection would result in an alarm or other indication across a broad array of environments. The inline electrical impulse capturer and booster relies on electrical characteristics and patterns and translating them into useful actions, and allows for the often-closed ecosystems of smart devices 20 to be opened to more universal applications, thereby broadening the applicability significantly and reducing the cost of adoption.

By integrating the inline electrical impulse capturer and booster into any system, the integration can cause triggers that are agnostic to ecosystem. The inline electrical impulse capturer and booster can cause, through a radio frequency signal produced in reaction to a trigger event, any number of potential actions.

Thus, specific embodiments of an inline electrical impulse capturer and booster have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. An inline electrical impulse capturer and booster for a smart device comprising:
   the smart device that communicates over a Wi-Fi network and said smart device is powered by a power supply;
   the inline electrical impulse capturer between said power supply and said smart device whereby a voltage drop in the power from said power supply being supplied to said smart device is detectable by said inline electrical impulse capturer;
   said inline electrical impulse capturer further having a capture circuit that is configured to detect said voltage being supplied to said smart device, a voltage converter circuit and a delivery circuit;
   said delivery circuit is configured to activate a radio frequency transmitter;
   a radio frequency receiver that is configured to receive a signal from said radio frequency transmitter, and
   said radio frequency receiver is configured to generate a response behavior, and
   wherein a change from said smart device will generate said response behavior.

2. The inline electrical impulse capturer and booster for a smart device according to claim 1, wherein said smart device is a video doorbell.

3. The inline electrical impulse capturer and booster for a smart device according to claim 1, wherein said response behavior operates with or without said Wi-Fi network.

4. The inline electrical impulse capturer and booster for a smart device according to claim 1, wherein said response behavior is selected from the group consisting of doorbell ring, a sound, a change in a light status, a change to an electrically powered device or a change to an outlet.

5. The inline electrical impulse capturer and booster for a smart device according to claim 1, wherein said capture circuit is a combination of resistors and electrical components that are configured to provide a voltage drop between said smart device and said power supply.

6. The inline electrical impulse capturer and booster for a smart device according to claim 5, wherein said capture circuit does not negatively impede said smart device.

7. The inline electrical impulse capturer and booster for a smart device according to claim 1, wherein said voltage converter circuit is a rectifier circuit.

8. The inline electrical impulse capturer and booster for a smart device according to claim 7, wherein said rectifier circuit is a rectifier, a bridge rectifier or a doubler rectifier circuit.

9. The inline electrical impulse capturer and booster for a smart device according to claim 1, wherein said voltage delivery circuit is configured to provide a signal to said RF transmitter such that said RF transmitter transmits a signal.

10. The inline electrical impulse capturer and booster for a smart device according to claim 1, wherein said response behavior occurs concomitant with a response behavior signaled by said smart device.

11. The inline electrical impulse capturer and booster for a smart device according to claim 1, wherein said response behavior occurs multiple times while a single response behavior signaled by said smart device is occurring.

12. The inline electrical impulse capturer and booster for a smart device according to claim 1, wherein said radio frequency transmitter sends an encoded signal.

13. The inline electrical impulse capturer and booster for a smart device according to claim 12, wherein said radio frequency receiver decodes said encoded signal.

14. The inline electrical impulse capturer and booster for a smart device according to claim 13, wherein generating said response behavior is performed when said decoded signal matches.

15. A method of detecting and communicating a notification from a smart device outside of wireless transmission from said smart device comprising:
   monitoring power voltage being supplied to the smart device from a power source;
   detecting a drop in electrical change in said power voltage to said smart device;
   activating a radio frequency transmitter based upon said detection, wherein said radio frequency transmitter is not associated with communication from said smart device;
   said activating a radio frequency transmitter transmits a radio signal;
   receiving said radio signal by a receiver, and
   generating a response behavior based upon said detection.

16. The method according to claim 15, wherein said smart device is a video doorbell.

17. The method according to claim 15, wherein said response behavior is selected from the group consisting of doorbell ring, a sound, a change in a light status, a change to an electrically powered device or a change to an outlet.

18. The method according to claim 15, wherein said response behavior occurs concomitant with a response behavior signaled by said smart device.

19. The method according to claim 15, wherein said response behavior occurs multiple times while a single response behavior signaled by said smart device is occurring.

20. The method according to claim 15, wherein said radio frequency transmitter sends an encoded signal.

* * * * *